United States Patent [19]
Shu

[11] Patent Number: 6,074,147
[45] Date of Patent: Jun. 13, 2000

[54] TAMPER-PROOF SET SCREW

[75] Inventor: Rei Chiu Shu, Canton, Mich.

[73] Assignee: Ford Motor Company, Dearborn, Mich.

[21] Appl. No.: 09/184,134

[22] Filed: Nov. 2, 1998

[51] Int. Cl.$^7$ .............................. F16B 35/00; F16B 39/00
[52] U.S. Cl. ...................... 411/393; 411/910; 411/258; 411/2
[58] Field of Search ................... 411/393, 910, 411/258, 82–82.5, 2–5

[56] References Cited

U.S. PATENT DOCUMENTS

| | | | |
|---|---|---|---|
| 1,231,164 | 6/1917 | Jahns | 411/910 |
| 2,572,613 | 10/1951 | Goff | 411/393 |
| 4,320,693 | 3/1982 | Benjamin . | |
| 4,506,917 | 3/1985 | Hansen Arne | 411/393 |
| 4,543,935 | 10/1985 | Tuckey . | |
| 4,718,828 | 1/1988 | Breeck | 411/910 |
| 4,867,624 | 9/1989 | Walley . | |
| 5,081,972 | 1/1992 | Daly et al. . | |
| 5,120,168 | 6/1992 | Padula . | |
| 5,713,705 | 2/1998 | Grunblchler . | |

FOREIGN PATENT DOCUMENTS

| | | | |
|---|---|---|---|
| 4122528 | 1/1993 | Germany | 411/258 |
| 2017250 | 10/1979 | United Kingdom | 411/393 |
| 2067699 | 7/1981 | United Kingdom | 411/910 |

*Primary Examiner*—Flemming Saether
*Attorney, Agent, or Firm*—Rhonda L. McCoy-Pfau

[57] ABSTRACT

A tamper-proof seat screw (30), such as an idle set screw for a throttle lever of a throttle body, comprises a tool-engageable head (31) at one end, a foot (34) at an opposite end, and a threaded shaft (32) between the head and the foot with the threaded shaft having an adhesive coating (36) thereon that forms an adhesive joint between the threaded shaft and a threaded throttle body bore (10a). An anti-tampering slip collar (42) is provided on an anti-tampering break-away shaft (40) between the threaded shaft and the foot to hinder post-factory tampering of the screw.

10 Claims, 2 Drawing Sheets

TAMPER-PROOF SET SCREW

BACKGROUND OF THE INVENTION

1. Field of the Invention

The present invention relates to a tamper-proof threaded member such as, for example, a seat or set screw.

2. Background Information

Vehicle manufacturers heretofore have used a tamper-resistant set screw on a throttle body of an internal combustion engine to set the position of a throttle lever to control engine idle speed, which is considered an emission critical parameter of engine operation. One such tamper-resistant set screw includes a screw head by which a threaded shaft or body of the screw is threaded into a tapped hole of the throttle body until the foot of the set screw engages and positions the throttle lever at a predetermined setting to achieve predetermined engine idle as dictated by engine system requirements. The threaded screw body of the idle set screw is provided with an adhesive coating that cures/hardens over time subsequent to engine idle setting to form an adhesive joint between the threaded screw body and threaded throttle body bore to lock the set screw position and hinder post-factory tampering. In addition, the screw head is mechanically broken or sheared off at the screw body to further hinder post-factory tampering of the set screw. However, a region of the threaded screw body proximate the foot extends exteriorly of the throttle body to an extent as to provide access to that region for potential post-factory tampering of the idle set screw using tools, such as vise grips, pliers and the like, that can grasp and turn the accessible region of the set screw.

An object of the present invention is to provide a seat or set screw, or other threaded member, with one or more anti-tampering features proximate a foot thereof in a manner to hinder potential tampering.

SUMMARY OF THE INVENTION

The present invention provides a threaded member comprising a tool-engageable head at one end, a foot at an opposite end, and a threaded shaft between the head and the foot with the threaded shaft having an adhesive coating thereon that forms an adhesive joint between the threaded shaft and a threaded bore after the threaded member is positioned therein. An anti-tampering stem or shaft is disposed between the threaded shaft and the foot and includes a cross-sectional dimension so selected that the anti-tampering shaft will break off before the adhesive joint fails in the event tampering torque is applied by a tampering tool to the foot after the threaded shaft is threaded and adhered in the bore.

The anti-tampering shaft includes an anti-tampering collar disposed thereon in a manner that the collar preferably moves or slips relative thereto in the event a tampering torque is applied to the collar such that the tampering torque is not transmitted to the anti-tampering shaft unless the collar is removed by tampering. The tool-engageable head of the threaded member may be broken off from the threaded shaft or be sized to fit within the threaded bore after set screw adjustment to hinder tampering at that end of the threaded member.

In accordance with another aspect of the present invention, a throttle body of an internal combustion engine includes a throttle lever and an engine idle set screw having a foot for engaging the throttle lever in a manner to adjust engine idle and including the anti-tampering features described above proximate the foot to hinder post-factory tampering of the engine idle setting.

The above objects, features and advantages of the present invention will become more readily apparent from the following detailed description taken with the following drawings.

DESCRIPTION OF THE INVENTION

Figure 1:
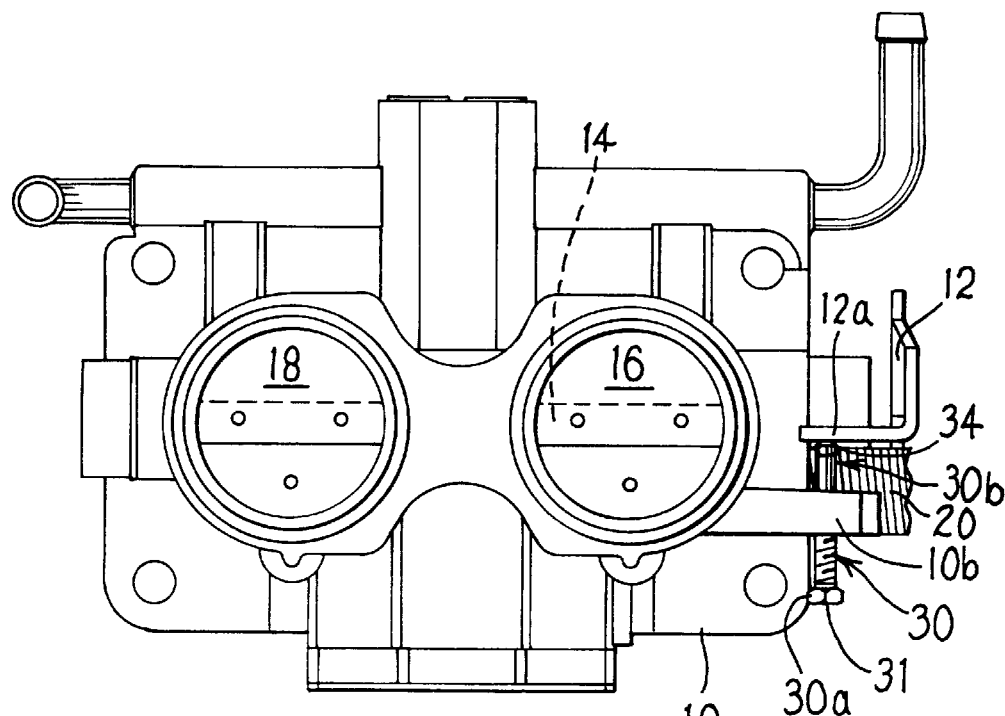
FIG. 1 a plan view of a throttle body of an internal combustion on engine.
Figure 2:
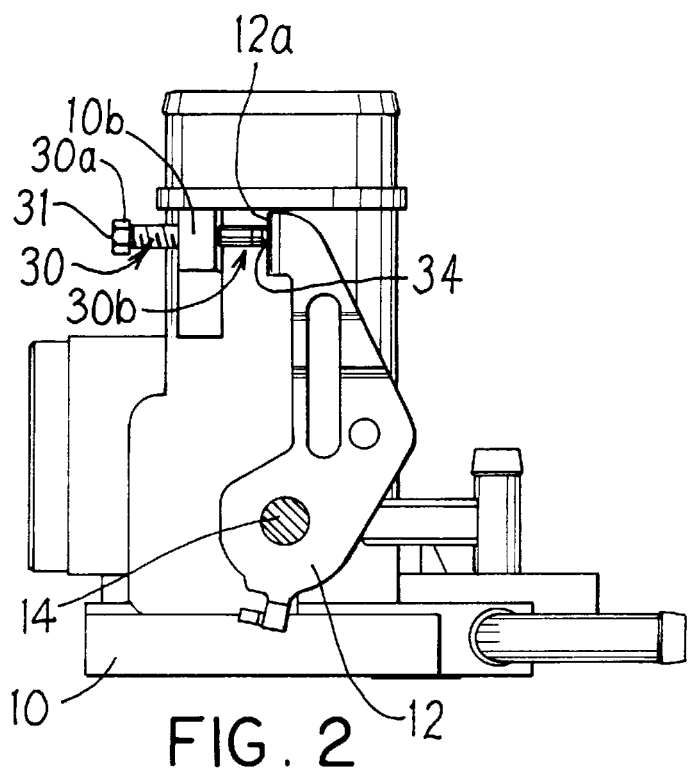
FIG. 2 is an elevational view of the throttle body.

Referring to FIGS. 1 and 2, a throttle body 10 of an internal combustion engine (not shown) is illustrated having a throttle lever 12 pivotally disposed thereon in conventional manner. For example, the throttle body 10 and throttle lever 12 are shown for purposes of illustration, and not limitation, as those present on a 5.8 liter V-8 gasoline engine manufactured by Ford Motor Company. The throttle lever 12 is connected to a shaft 14 that in turn actuates butterfly valves 16, 18 in the throttle body 10 to control combustion air flow to the engine in known manner. The throttle lever 12 is biased by spring 20 in a counterclockwise direction such that a stop shoulder or flange 12a formed on the throttle lever abuts a idle set screw 30. Using a conventional adjustment tool, such as a wrench (not shown), the set screw 30 is adjustably threaded into a threaded bore 10a extending through an integral narrow width boss 10b of the throttle body 10.

To this end, the idle set screw 30 includes an adjustment tool-engageable head 31 at one end 30a for engagement by the adjustment tool, a threaded body or shaft 32 and a foot 34 at an opposite end 30b. The threaded shaft 32 includes a circumferential groove 32a and an adhesive coating 36 that cures/hardens over time subsequent to engine idle setting to form an adhesive joint J between the threaded shaft 32 and the threaded throttle body bore 10a to lock the set screw adjusted position in bore 10a and hinder post-factory tampering. The adhesive coating 36 may be selected from heat curable epoxy resins or other suitable adhesive materials in use heretofore that provide a minimum time period to allow the set screw 30 to be threaded to a desired adjusted position that defines throttle linkage position due to contact with the throttle lever flange 12a and thereafter to cure/harden to lock the adjusted set screw position.

In accordance with the present invention, the set screw 30 is provided with one or more anti-tampering features proximate the foot 34, in particular at a region of the set screw which is accessible or exposed to potential tampering between the throttle body boss 10b and the throttle lever stop flange 12a as is best apparent in FIG. 1. One anti-tampering feature comprises an anti-tampering shaft 40, such as the cylindrical stem shown, disposed between the threaded shaft 32 and the foot 34, FIG. 3. The cross-sectional dimension (e.g. diameter) of the anti-tampering shaft 40 is so selected that the shaft 40 will break off or fracture before the adhesive joint J fails (to hold the set screw 30 in position in bore 10*a*) when a tampering torque is applied to the shaft 40 by a tampering tool, such as vise grip or the like, after the threaded shaft 32 is threaded and adhered in the bore 10*a*. The cross-sectional dimension (e.g. diameter) of the anti-tampering shaft 40 typically is less than the minor (root) diameter of the adjacent threaded shaft 32 to this end.

The anti-tampering shaft 40 terminates in the enlarged end or foot 34 having a spherical seating surface 34*b* for providing a desired contact profile with the throttle lever flange 12*a* as described above to set engine idle. The enlarged foot 34 includes a cylindrical section 34*a* having an outer diameter less than the minor diameter of threaded shaft 32.

For purposes of illustrating and not limiting the present invention, the set screw 30 can comprise a #10–32 NF-2THD hex head screw comprising SAE J429 steel. The set screw 30 can be machined or otherwise formed to have the cylindrical anti-tampering shaft 40 illustrated. For example only, the anti-tampering shaft 40 can have an axial length of 2.5 mm (millimeters) and an outer diameter of 0.8 mm. The threaded shaft 32 can have an axial length of 2.5 mm and a major diameter of 5 mm. The cylindrical section 34*a* of foot 34 can have an outer diameter of 3.88 mm and axial length of 1 mm.

The anti-tampering features proximate the set screw foot 34 also can include an annular collar 42 disposed on the anti-tampering shaft 40 in a manner that the collar preferably moves or slips relative thereto in the event a tampering torque is applied to the collar, whereby the tampering torque is not transmitted to the anti-tampering shaft 40. Should the collar 42 not slip when tampering torque is applied thereto, then the anti-tampering shaft 40 will break off as described above from the tampering torque transmitted thereto. The collar 42 includes an outer diameter generally equal to that of the foot 34 and can comprise a plastic material, such as polyurethane, molded in-situ about the anti-tampering shaft 40 in a suitable die cavity. Alternately, the collar may comprise a separate performed ring or annulus of plastic or metal configured with an axial slit in a manner that permits the collar to be snap-fit on the shaft 40. The collar 42 includes axial ends 42*a* in such close tolerance fit to the adjacent axial end surfaces of the threaded shaft 32 and the foot 34 as to absorb some of the impact force imparted to the foot 34 by usual throttle snap back conditions during engine operation and to protect the anti-tampering shaft 40 from bending or other damage during assembly of the throttle body components.

Figure 3:
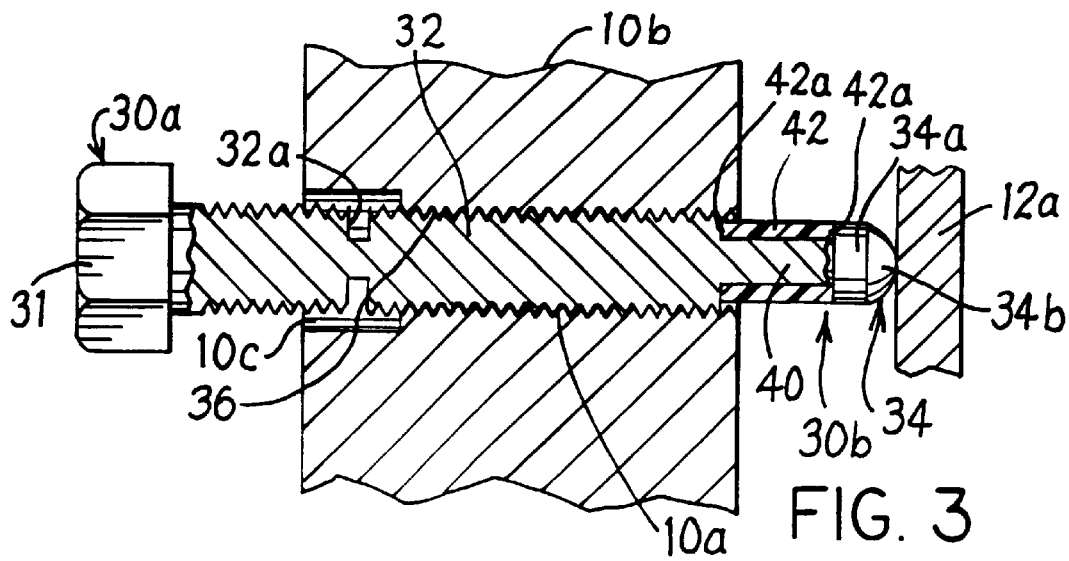
FIG. 3 is a partial sectional view of a tamper-proof set screw pursuant to an embodiment of the present invention after adjustment.
Figure 4:
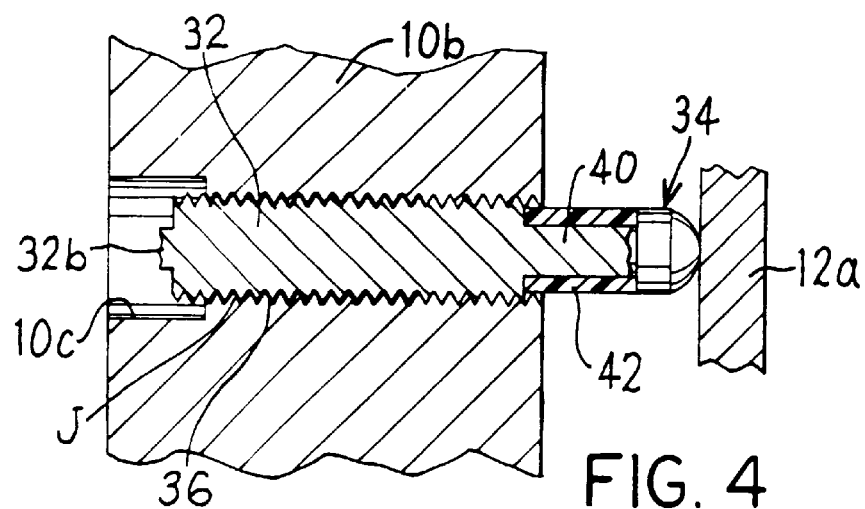
FIG. 4 is a partial sectional view of the tamper-proof set screw illustrating the screw head broken off after adjustment.

In assembly of the throttle body components, the set screw 30 described above is threaded into the threaded bore 10*a* until foot 34 positions the throttle lever 12 at a setting to achieve desired engine idle as dictated by engine system requirements. Following set screw adjustment, the screw head 31 and an adjacent portion of threaded shaft 32 are broken or sheared off in an enlarged unthreaded counterbore region 10*c* provided in the throttle body bore 10*a* to this end. Breaking off of the threaded shaft 32 is assisted by the stress concentrator circumferential groove 32*a*, leaving a reduced diameter broken-off axial stub 32*b* of the set screw 30 residing within the throttle body bore 10*a* as illustrated in FIG. 4. The end of the threaded shaft 32 proximate anti-tampering shaft 40 is located within the throttle body bore 10*a* as also illustrated in FIG. 3.

Figure 5:
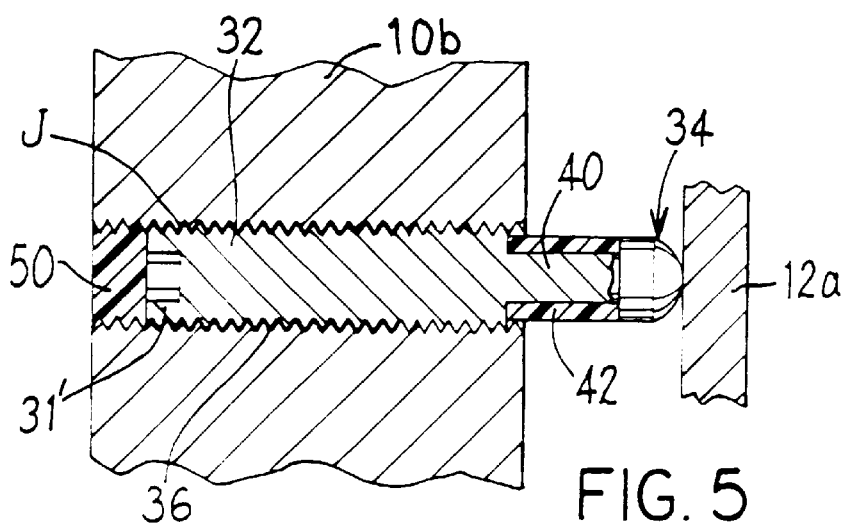
FIG. 5 is a sectional view of a tamper-proof set screw pursuant to another embodiment of the present invention after adjustment.

In an alternate embodiment of the invention, FIG. 5, wherein like features are designated by like reference numerals, the set screw can include a smaller head 31' having a tool-engageable socket shown by way of example only. The head 31' is so sized as to be received within the throttle body bore 10*a* after adjustment of the set screw by threading so as to reside in a position that hinders tampering at that end of the set screw. The throttle body bore then may be closed off with a plug 50 comprising epoxy or other material, or a mechanical plug inserted therein.

Following set screw adjustment, the adhesive coating 36 cures/hardens to lock the adjusted position of the set screw 30 in bore 10*a*. Subsequent field tampering of the set screw 30 is hindered by the collar 42 on the anti-tampering shaft 40 in the event tampering torque is applied directly to the collar. In particular, the tampering torque is not transmitted to the anti-tampering shaft by virtue of the relative movement or slipping of the collar 42 thereon. If the collar 42 does not slip such that torque is transmitted to the underlying anti-tampering shaft 40, the shaft 40 will break off before the adhesive joint J fails so as to hinder tampering. Further, if the collar 42 is removed by tampering such that anti-tampering shaft 40 is directly gripped by a tampering tool, then the shaft 40 again will break off before the adhesive joint J fails when a tampering torque is applied to the shaft 40. Similarly, if the foot 34 should be gripped by a tampering tool, then the shaft 40 will break off when a tampering torque is applied. The set screw 30 thereby is rendered tamper-proof pursuant to the present invention.

While the invention is described above in terms of specific embodiments thereof, it is not intended to be limited thereto but rather only to the extent set forth in the following claims.

I claim:

1. A threaded member, comprising a tool-engageable head at one end, a foot at an opposite end, and a threaded shaft between said head and said foot with the threaded shaft having an adhesive thereon and further comprising an anti-tampering shaft between said threaded shaft and said foot, said anti-tampering shaft having such a cross-sectional dimension that said anti-tampering shaft will break off before said adhesive fails in the event tampering torque is applied thereto.

2. The member of claim 1 further including an anti-tampering collar disposed on said anti-tampering shaft.

3. The member of claim 2 wherein said anti-tampering collar is disposed on said anti-tampering shaft in a manner that said collar moves relative thereto in the event tampering torque is applied directly to said collar, whereby said tampering torque is not transmitted to said anti-tampering shaft.

4. The member of claim 1 wherein said anti-tampering shaft comprises a cylindrical shaft having a reduced diameter compared to that of said threaded shaft.

5. The combination of a body having a threaded bore and a set screw relative to which a member is positioned with respect to said body, said set screw comprising a tool-engageable head at one end, a foot at an opposite end, and a threaded shaft between said head and said foot with said threaded shaft having an adhesive coating thereon that forms an adhesive joint between said threaded shaft and said threaded bore, and further comprising an anti-tampering shaft between said threaded shaft and said foot, said anti-tampering shaft having such a cross-sectional dimension that said anti-tampering shaft will break off before said adhesive joint fails in the event tampering torque is applied thereto.

6. The combination of claim 5 further including an anti-tampering collar disposed on said anti-tampering shaft.

7. The combination of claim 6 wherein said anti-tampering collar is disposed on said anti-tampering shaft in a manner that said collar moves relative thereto in the event tampering torque is applied directly to said collar, whereby said tampering torque is not transmitted to said anti-tampering shaft.

8. The combination of claim 5 wherein said anti-tampering shaft comprises a cylindrical shaft having a reduced diameter compared to that of said threaded shaft.

9. A method of setting the position of a set screw for a throttle lever of a throttle body, comprising threading a threaded shaft of said set screw into a threaded bore of said throttle body such that a foot of said set screw is adjustably positioned relative to said lever, forming an adhesive joint between said threaded shaft and said bore, and positioning an anti-tampering shaft of said set screw disposed between said foot and said threaded shaft to reside outside of said bore with said anti-tampering shaft having such a cross-sectional dimension that said anti-tampering shaft will break off before said adhesive joint fails in the event a tampering torque is applied to said anti-tampering shaft.

10. The method of claim 9 including positioning an anti-tampering collar on said anti-tampering shaft in a manner that said collar moves relative thereto in the event tampering torque is applied directly to said collar such that the tampering torque is not transmitted to said anti-tampering shaft.

* * * * *